US006978471B1

(12) United States Patent
Klopfenstein

(10) Patent No.: US 6,978,471 B1
(45) Date of Patent: Dec. 20, 2005

(54) SYSTEM FOR ACQUIRING AND PROCESSING BROADCAST PROGRAMS AND PROGRAM GUIDE DATA

(75) Inventor: Scott Edward Klopfenstein, Fishers, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/505,588

(22) Filed: Feb. 16, 2000

Related U.S. Application Data

(60) Provisional application No. 60/135,857, filed on May 25, 1999.

(51) Int. Cl.$^7$ .......................... G06F 3/00; G06F 13/00; H04N 5/445
(52) U.S. Cl. .......................... 725/50; 725/54
(58) Field of Search .......................... 725/39, 59, 54, 725/48–50; 348/731, 732

(56) References Cited

U.S. PATENT DOCUMENTS

| 5,359,601 | A |   | 10/1994 | Wasilewski et al. ........... 370/73 |
| 5,459,522 | A |   | 10/1995 | Pint ........................... 348/478 |
| 5,521,979 | A |   | 5/1996  | Deiss .......................... 380/20 |
| 5,594,492 | A |   | 1/1997  | O'Callaghan et al. ........ 348/10 |
| 5,600,378 | A |   | 2/1997  | Wasilewski .................. 348/468 |
| 5,625,406 | A | * | 4/1997  | Newberry et al. ............. 725/49 |
| 5,642,153 | A |   | 6/1997  | Chaney et al. ................. 348/7 |
| 5,699,125 | A | * | 12/1997 | Rzeszewski et al. .......... 725/48 |
| 5,734,589 | A | * | 3/1998  | Kostreski et al. ........... 345/716 |
| 5,808,694 | A |   | 9/1998  | Usui et al. .................. 348/569 |
| 5,926,207 | A | * | 7/1999  | Vaughan et al. ............. 725/139 |
| 5,946,045 | A |   | 8/1999  | Ozkan et al. ............... 348/467 |

(Continued)

FOREIGN PATENT DOCUMENTS

| CN | 1193241 A   | 12/1997 | ............ H04N 7/08  |
| EP | 751680 A2   | 1/1997  | ............ H04N 5/44  |
| EP | 758833 A2   | 2/1997  | ............ H04N 7/16  |
| EP | 849947 A1 * | 6/1998  | .......... H04N 7/088   |
| EP | 0849947 A1  | 6/1998  | .......... H04N 7/088   |
| EP | 0849954 A2  | 6/1998  | ............ H04N 7/58  |
| WO | WO99/03269  | 1/1999  | ............ H04N 5/44  |
| WO | WO99/35849  | 7/1999  | ............ H04N 7/16  |

OTHER PUBLICATIONS

Program Guide for Digital Television, ATSC Standard, Advanced Television Systems Committee, Jan. 3, 1996, pp. 1-48.

European Telecommunication Standard, Electronic Programme Guide (EPG); Protocol for a TV Guide Using Electronic Data Transmission, May, 1997, pp. 30-62.

(Continued)

*Primary Examiner*—John Miller
*Assistant Examiner*—Scott Beliveau
(74) *Attorney, Agent, or Firm*—Joseph S. Tripoli; Ronald H. Kurdyla; Joel Fogelson

(57) ABSTRACT

Decoder system initialization involves scanning to associate a particular program guide with individual channels. A similar procedure is also performed upon introduction of a new channel. A system for acquiring program guide information conveyed on one of a plurality of broadcast channels involves scanning through received broadcast channels to identify program guides available on individual channels. A program guide of a selected program guide type (e.g. analog-VBI type, MPEG PSI type or ATSC PSIP type) is associated with a broadcast channel by updating a video decoder database. The program guide of the selected program guide type is acquired and used in capturing packetized program information comprising a program conveyed on an individual broadcast channel. In another feature, data received on an individual broadcast channel is examined to identify program guides of particular type in a predetermined order.

15 Claims, 8 Drawing Sheets

U.S. PATENT DOCUMENTS

| | | | | |
|---|---|---|---|---|
| 5,982,411 A | * | 11/1999 | Eyer et al. | 725/49 |
| 6,003,041 A | * | 12/1999 | Wugofski | 707/104.1 |
| 6,160,545 A | * | 12/2000 | Eyer et al. | 725/39 |
| 6,212,680 B1 | * | 4/2001 | Tsinberg et al. | 725/39 |
| 6,249,320 B1 | * | 6/2001 | Schneidewend et al. | 725/56 |
| 6,337,719 B1 | * | 1/2002 | Cuccia | 348/731 |
| 6,359,580 B1 | * | 3/2002 | Morrison | 348/731 |
| 6,405,372 B1 | * | 6/2002 | Kim et al. | 348/732 |
| 6,483,547 B1 | * | 11/2002 | Eyer | 348/731 |
| 6,486,925 B1 | * | 11/2002 | Ko | 348/731 |

OTHER PUBLICATIONS

Generic Coding of Moving Pictures and Associated Audio, ISO/IEC 13818-1, Jun. 10, 1994, pp. 10-46.

European Telecommunication Standard, Digital Broadcasting Systems for Television sound and Data Services, Oct. 1995, pp. 3-61.

Anthony J. Wasilewski, *The MPEG-2 Systems Specification: A Common Transport for the Digital Highway*, Annual Review of Communications, 1997, XP000720947, p. 790, right-hand column, line 12-p. 792, left-hand column, line 15.

PCT Search Report.

* cited by examiner

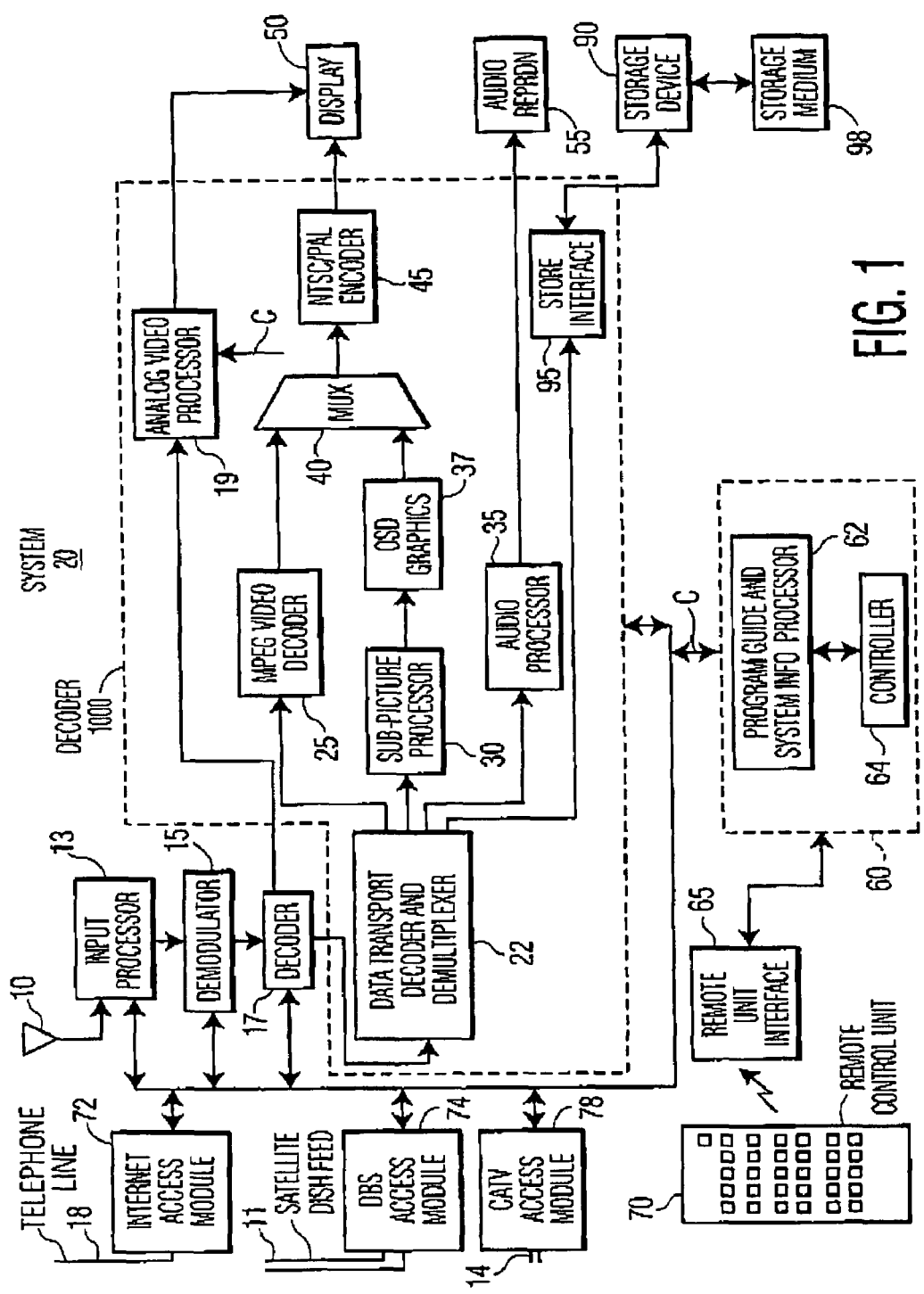

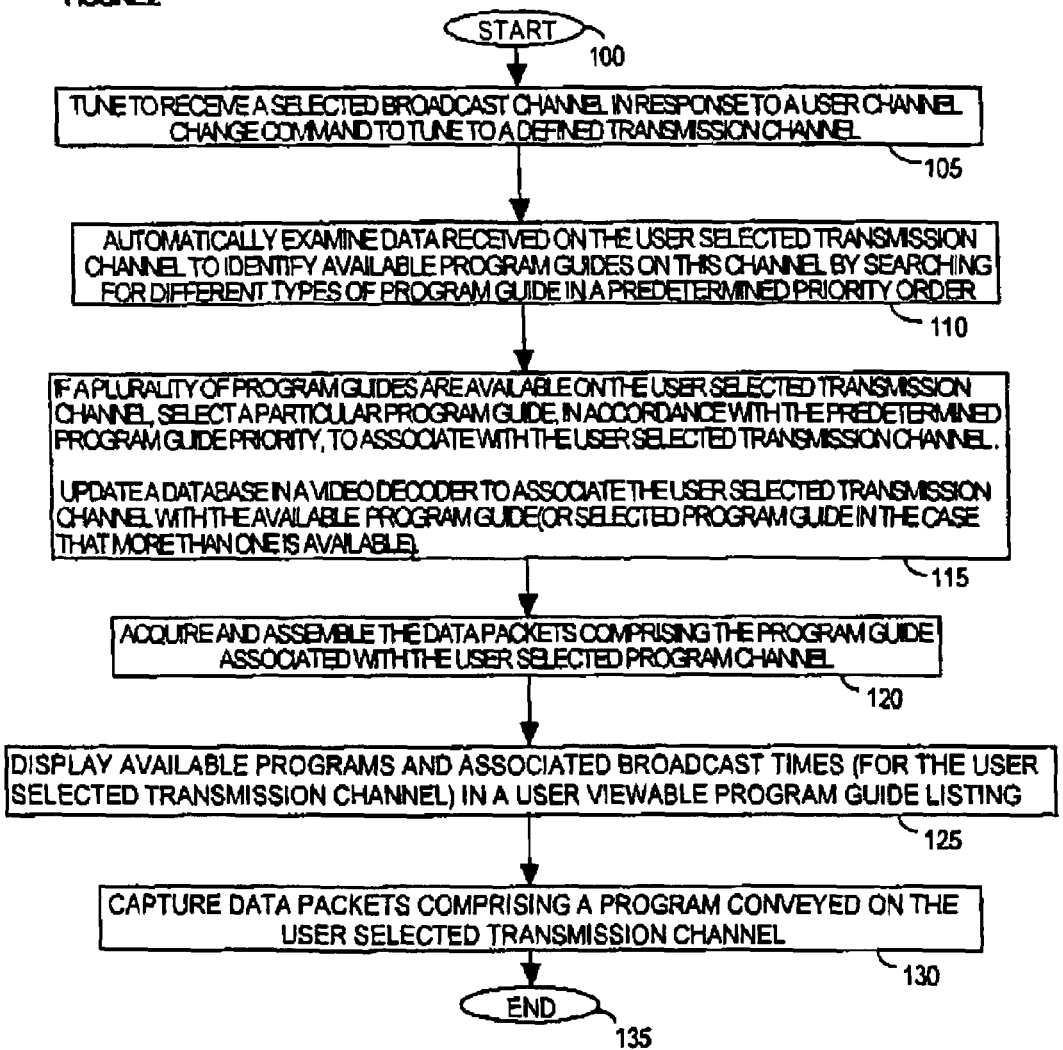

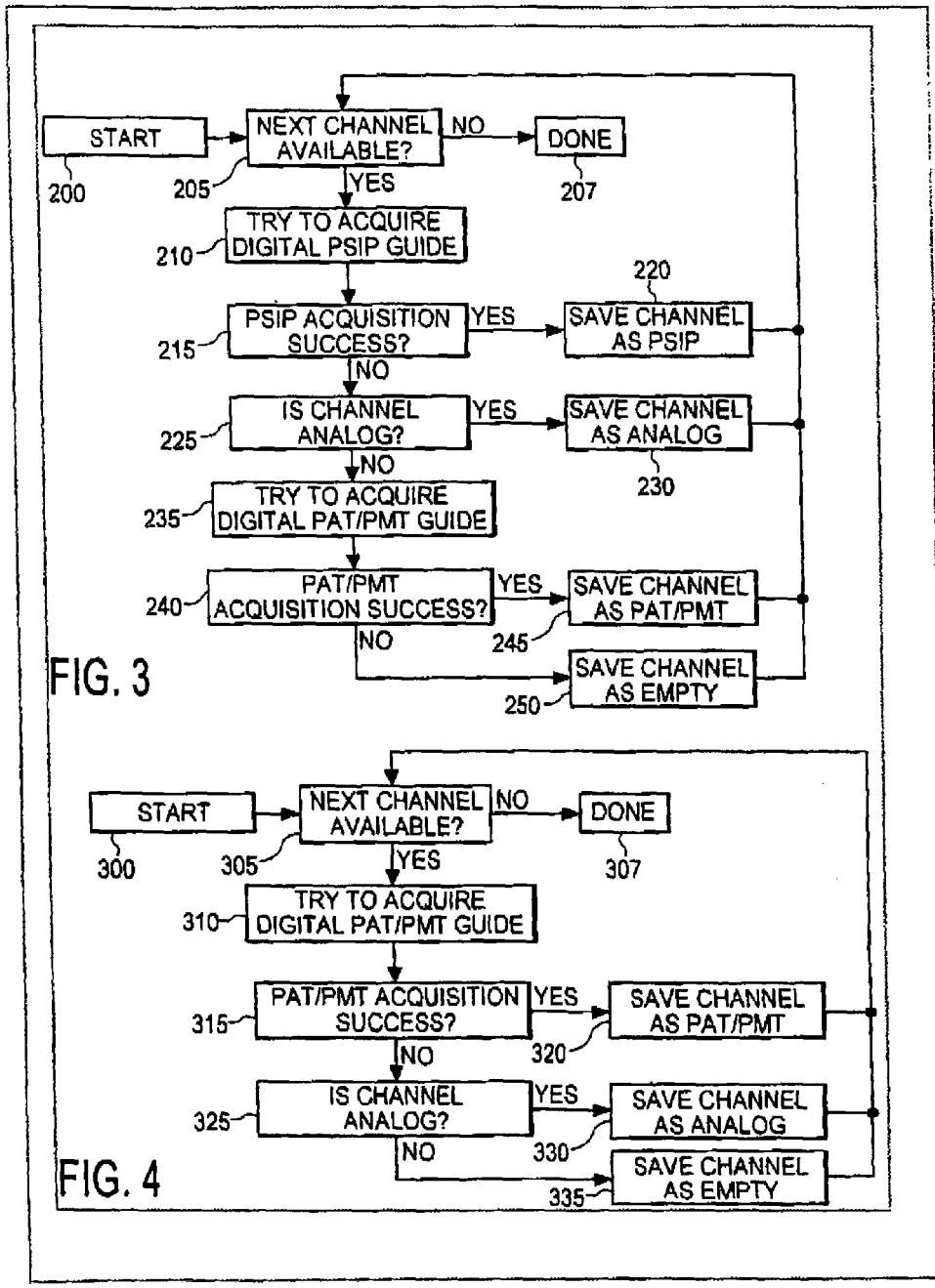

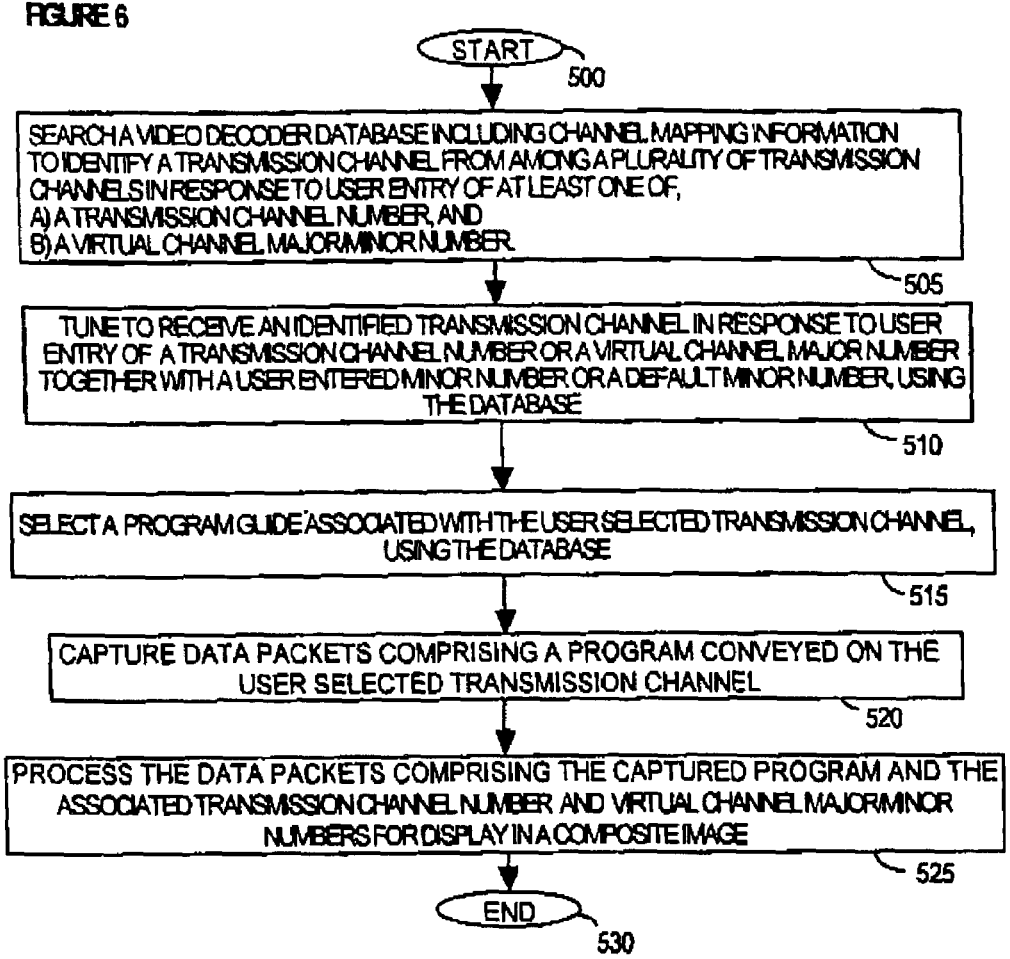

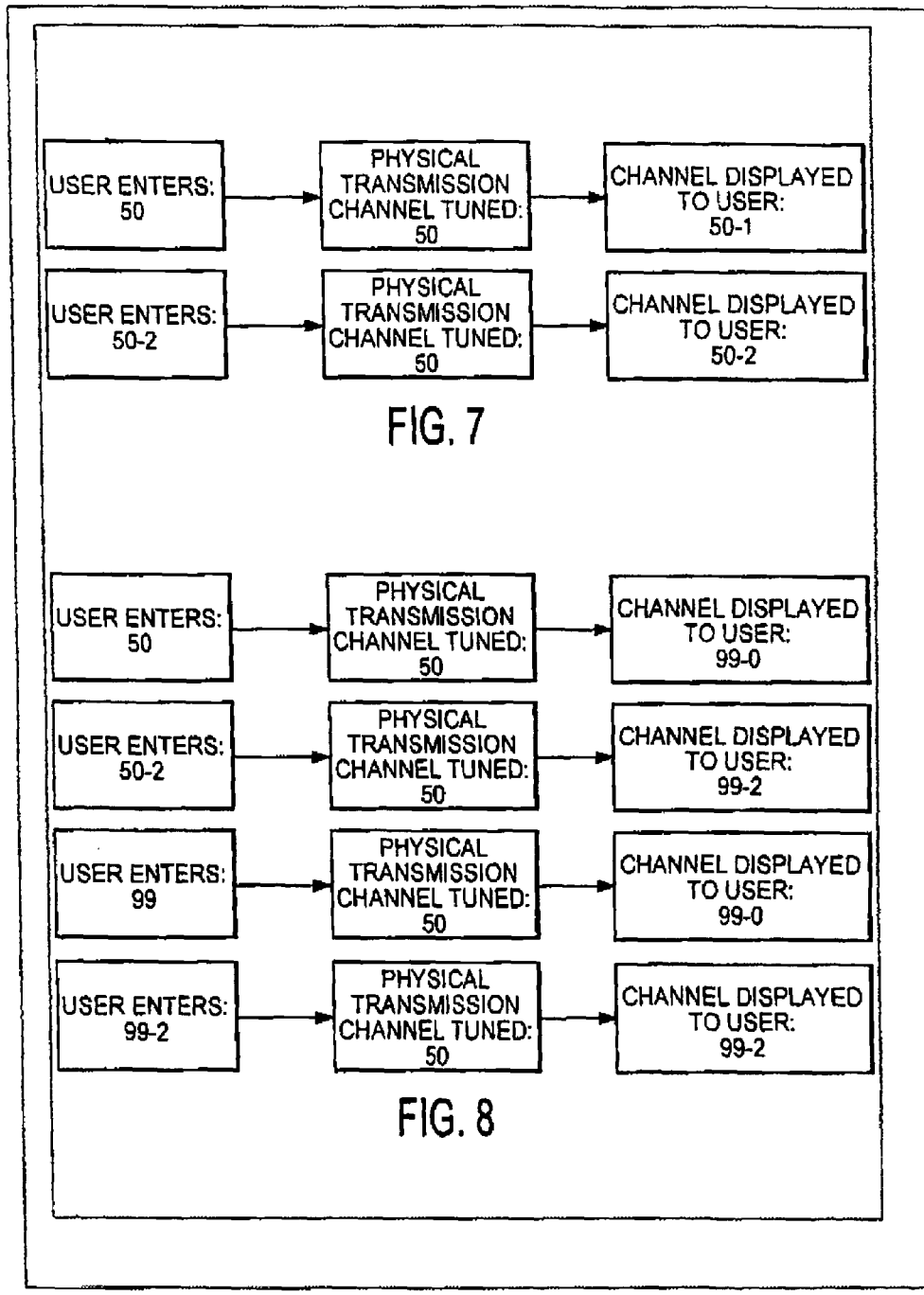

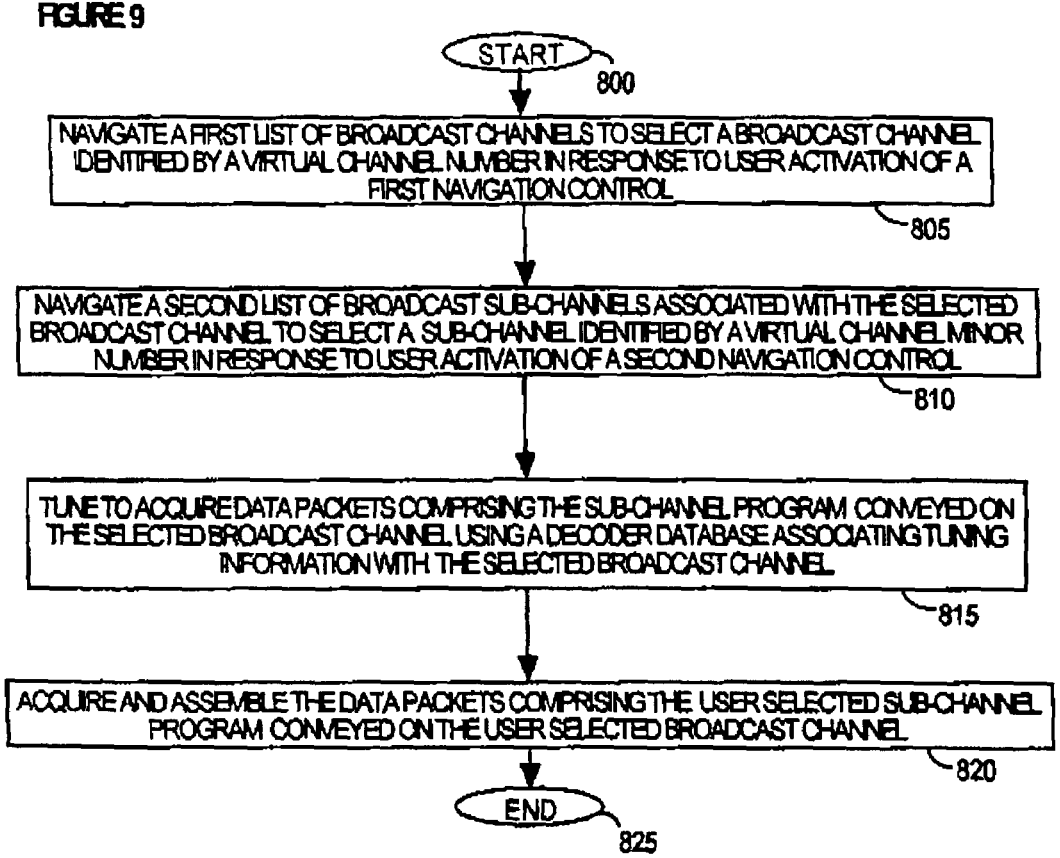

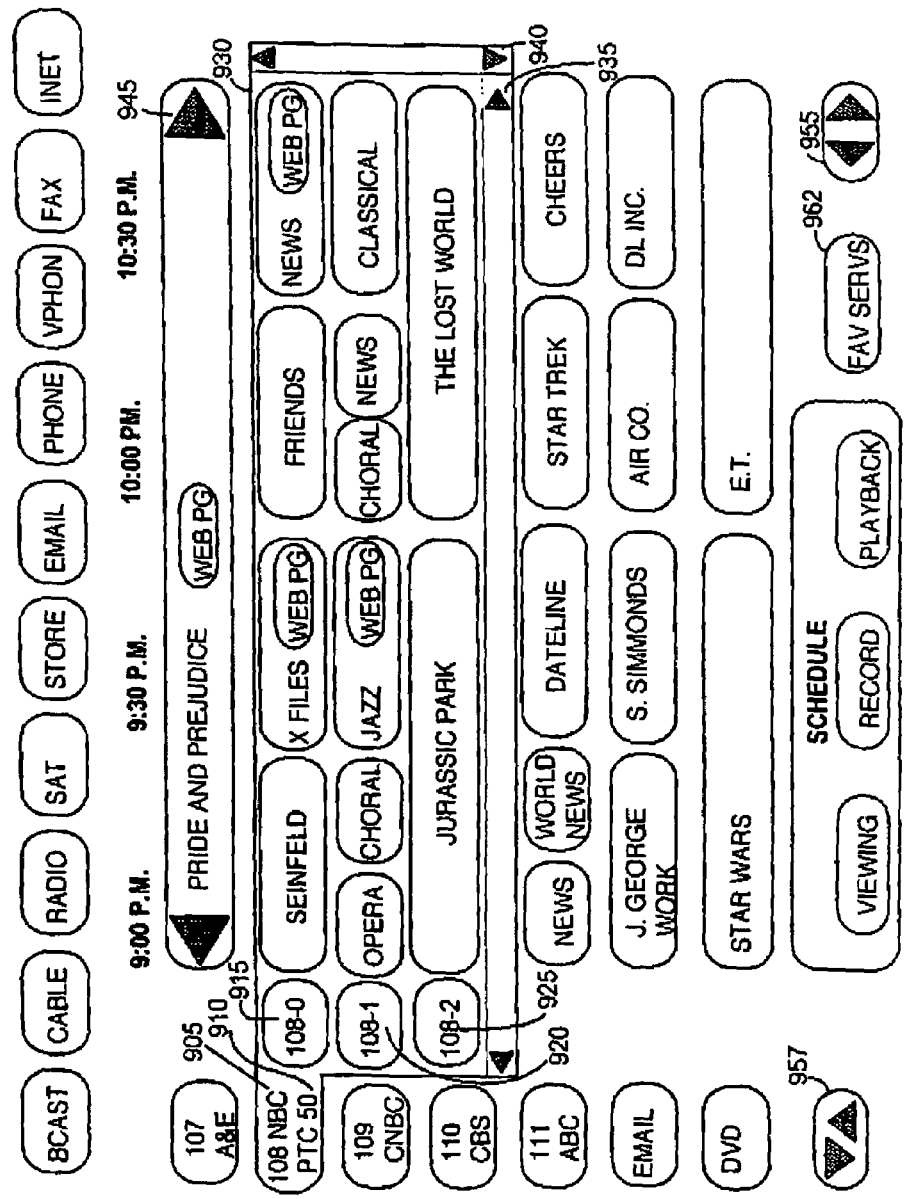

US 6,978,471 B1

SYSTEM FOR ACQUIRING AND PROCESSING BROADCAST PROGRAMS AND PROGRAM GUIDE DATA

This is a non-provisional application of provisional application Ser. No. 60/135,857 by S. Klopfenstein, filed May 25, 1999.

FIELD OF THE INVENTION

This invention is related to the processing of broadcast Program Guides, system information and program specific information.

BACKGROUND OF THE INVENTION

In video broadcast and processing applications, digital video data is typically encoded to conform to the requirements of a known standard. One such widely adopted standard is the MPEG2 (Moving Pictures Expert Group) image encoding standard, hereinafter referred to as the "MPEG standard". The MPEG standard is comprised of a system encoding section (ISO/IEC 13818-1, 10th Jun. 1994) and a video encoding section (ISO/IEC 13818-2, 20th Jan. 1995). Data encoded to the MPEG standard is in the form of a packetized datastream which typically includes the data content of many program channels (e.g. content corresponding to cable television channels 1–125). Further, several digital services and channels may occupy the frequency spectrum previously occupied by a single analog channel. A 6 MHz bandwidth previously allocated to an analog NTSC compatible broadcast channel may now be split into a number of digital sub-channels offering a variety of services. For example, the broadcast spectrum for RF channel 13 may be allocated to sub-channels including a main program channel, a financial service channel offering stock quotes, a sports news service channel and a shopping and interactive channel. In addition, data conveyed in different sub-channels may be in different data formats (e.g. analog, digital etc.). Further, both the quantity of sub-channels transmitted and the individual sub-channel bandwidth may be changed dynamically to accommodate changing broadcast programming requirements.

In such a digital video system the proliferation in the quantity of services being broadcast and the increased variety of their content, as well as the ability of a broadcaster to dynamically vary the number and allocated bandwidth of these channels poses a number of problems. Specifically, the increase in the quantity of broadcast channels may increase the difficulty of tuning and lengthen the time required to acquire a selected program channel. Further, as the quantity of channels increases, so does the quantity of ancillary program specific information required in decoding the transmitted program data. The ancillary program specific information includes data used in identifying and assembling packets comprising selected programs and also includes program guide and text information associated with the transmitted program data. The acquisition and management of ancillary program specific information required to receive and decode programs and the management of channel numbering in a digital video system poses additional problems. These problems and derivative problems are addressed by a system according to the invention principles.

SUMMARY OF THE INVENTION

A system for acquiring program guide information conveyed on one of a plurality of broadcast channels involves scanning through received broadcast channels to identify program guides available on individual channels. A program guide of a selected program guide type (e.g. analog-VBI type, MPEG PSI type or ATSC PSIP type) is associated with a broadcast channel by updating a video decoder database. The program guide of the selected program guide type is acquired and used in capturing packetized program information comprising a program conveyed on an individual broadcast channel. In another feature, data received on an individual broadcast channel is examined to identify program guides of particular type in a predetermined order.

BRIEF DESCRIPTION OF THE DRAWINGS

In the drawing:

FIG. 1 is a block diagram of digital video receiving apparatus for processing broadcast signals, according to the principles of the invention.

FIG. 2 shows a flowchart of a method for acquiring program guide information conveyed on a transmission channel conveying a user selected broadcast channel and for identifying and associating an individual broadcast channel with a specific program guide, according to the invention.

FIG. 3 shows a flowchart of a decoder initialization method for scanning through received terrestrial broadcast channels to associate individual terrestrial broadcast channels with corresponding program guides, according to the invention.

FIG. 4 shows a flowchart of a decoder initialization method for scanning through received cable broadcast channels to associate individual cable broadcast channels with corresponding program guides, according to the invention.

FIG. 6 shows a flowchart of a method involving channel number mapping for processing program content data and channel identification numbers to provide a composite image for display, according to the invention.

FIGS. 7 and 8 show examples of decoder tuning based on channel mapping for an MPEG PSI program guide and an ATSC PSIP compatible program guide respectively, according to the invention.

FIG. 9 shows a flowchart for a method for acquiring program content data in response to User channel selection via navigation through hierarchically associated channel lists, according to the invention.

FIG. 10 shows an exemplary program guide display including hierarchically associated channel lists and associated menu navigation controls, according to the invention.

DETAILED DESCRIPTION OF THE DRAWINGS

Figure 5:
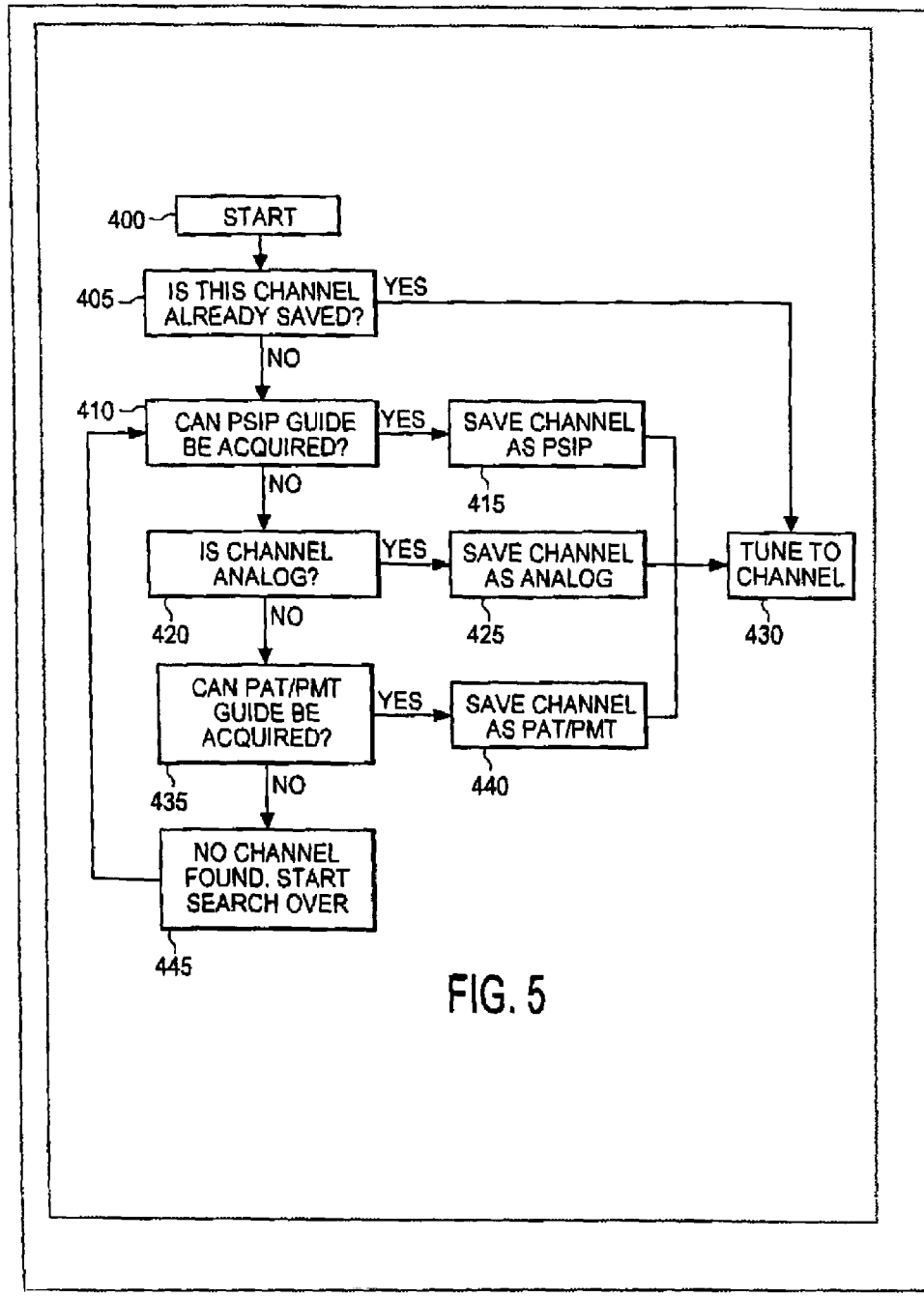
FIG. 5 shows a flowchart of a method for determining program guide availability on a broadcast channel in response to User entry of a channel identification number or in response to the addition of a new channel to a decoder channel line-up, for example, according to the invention.

FIG. 1 is a block diagram of digital video receiving apparatus for processing broadcast signals. The disclosed system involves processing video signals incorporating ancillary program specific information including program guide data in datastream containing program representative multiplexed audio, video and data components. The transport stream from unit 17 is demultiplexed into audio, video and data components by unit 22 which are further processed by the other elements of decoder system 1000. These other elements include video decoder 25, audio processor 35, sub-picture processor 30, on-screen graphics display generator (OSD) 37, multiplexer 40, NTSC encoder 45 and storage interface 95. In one mode, decoder 1000 provides MPEG decoded data for display and audio reproduction on units 50 and 55 respectively. In another mode, the transport stream from unit 17 is processed by decoder 1000 to provide an MPEG compatible datastream for storage on storage medium 98 via storage device 90. In an analog video signal processing mode, unit 19 processes a received video signal from unit 17 to provide an NTSC compatible signal for display and audio reproduction on units 50 and 55 respectively.

In other input data modes, units 72, 74 and 78 provide interfaces for Internet streamed video and audio data from telephone line 18, satellite data from feed line 11 and cable video from cable line 14 respectively. The processed data from units 72, 74 and 78 is appropriately decoded by unit 17 and is provided to decoder 1000 for further processing in similar fashion to that described in connection with the terrestrial broadcast input via antenna 10.

A user selects for viewing either a TV channel or an on-screen menu, such as a program guide, by using a remote control unit 70. Processor 60 uses the selection information provided from remote control unit 70 via interface 65 to appropriately configure the elements of FIG. 1 to receive a desired program channel for viewing. Processor 60 comprises processor 62 and controller 64. Unit 62 processes (i.e. parses, collates and assembles) program specific information including program guide and system information and controller 64 performs the remaining control functions required in operating decoder 1000. Although the functions of unit 60 may be implemented as separate elements 62 and 64 as depicted in FIG. 1, they may alternatively be implemented within a single processor. For example, the functions of units 62 and 64 may be incorporated within the programmed instructions of a microprocessor. Processor 60 configures processor 13, demodulator 15, decoder 17 and decoder system 1000 to demodulate and decode the input signal format and coding type. Units 13, 15, 17 and sub-units within decoder 1000 are individually configured for the input signal type by processor 60 setting control register values within these elements using a bi-directional data and control signal bus C.

The transport stream provided to decoder 1000 comprises data packets containing program channel data and program specific information. Unit 22 directs the program specific information packets to processor 60 which parses, collates and assembles this information into hierarchically arranged tables. Individual data packets comprising the User selected program channel are identified and assembled using the assembled program specific information. The program specific information contains conditional access, network information and identification and linking data enabling the system of FIG. 1 to tune to a desired channel and assemble data packets to form complete programs. The program specific information also contains ancillary program guide information (e.g. an Electronic Program Guide—EPG) and descriptive text related to the broadcast programs as well as data supporting the identification and assembly of this ancillary information.

In acquiring program guide information, decoder 1000 (with processor 60) determines whether a received signal represents an analog or digital channel and also determines the type of program guide information available on the received channel. An analog channel VBI guide or a digital program guide (an MPEG PSI type guide or an ATSC PSIP type guide, for example) may then be subsequently acquired. Upon determining whether a PSIP, MPEG PSI, or VBI guide is present for a broadcast channel, or whether the broadcast channel is an analog channel with no VBI guide, decoder 1000 (with unit 60) updates stored database information to associate one of the guides with the desired broadcast channel.

The different types of program specific information and program guides (e.g. PSIP, MPEG PSI, or VBI guide) are acquired and assembled by processor 60 to form their respective data structures. Processor 60 assembles a digital ATSC PSIP guide (and also an MPEG PSI guide), for example, into multiple hierarchically arranged and inter-linked tables. Similarly, processor 60 assembles analog VBI data to form a program guide database (stored in the memory structure of processor 60, for example) for use in performing program related decoder functions (e.g. time shifted program recording) and a guide for display in accordance with the system requirements.

An exemplary hierarchical PSIP table arrangement includes a Master Guide Table (MGT), a Channel Information Table (CIT), Event Information Tables (EITs) and optional tables such as Extended Text Tables (ETTs). The MGT contains information for acquiring program specific information conveyed in other tables such as identifiers for identifying data packets associated with the other tables. The CIT contains information for tuning and navigation to receive a User selected program channel. The EIT contains descriptive lists of programs (events) receivable on the channels listed in the CIT. The ETT contains text messages describing programs and program channels. Additional program specific information describing and supplementing items within the hierarchical tables is conveyed within descriptor information elements. The resulting program specific information data structure formed by processor 60 via unit 22 is stored within internal memory of unit 60.

If the acquired program specific information is conveyed in MPEG PSI format it is similarly formed into tables in accordance with the MPEG systems standard section 2.4.4. These tables may include a Program Association Table (PAT), a Program Map Table (PMT), and may also include a Network Information Table (NIT) and a Conditional Access Table (CAT). Each table is formed from data packets that are recognized by a particular PID. The PMT defines the PID labels that identify the individual packetized datastreams that constitute a program. These individual streams are termed elementary streams. Elementary streams include datastreams such as a video datastream and individual audio datastreams for various languages as well as caption datastreams. The PAT associates a program number with the PIDs that permit identification and assembly of the packets comprising the PMT. The NIT is optional and may be structured and used to define physical network parameters such as satellite transmission channel frequencies and transponder channels, for example. The CAT contains the conditional access information such as encryption codes that govern access to programs that are dependent upon user entitlement.

FIGS. 2–5 show methods employed by processor 60 in controlling the decoder of FIG. 1 in acquiring different types of program guide information (e.g. analog-VBI type, MPEG PSI type or ATSC PSIP type) conveyed on multiple broadcast channels for use in capturing packetized program information comprising a program conveyed on an individual broadcast channel. Specifically, FIG. 2 shows a flowchart of a method for acquiring program guide information and for identifying and associating an individual broadcast channel with a specific program guide. This advantageously reduces the need to search for a guide to be used in processing a future selected broadcast channel and reduces program and channel acquisition times. In step 105, following the start at step 100, processor 60 directs system 20 to tune to receive a physical transmission channel (PTC) conveying a user selected broadcast channel. If the received broadcast channel is digital, processor 60, in step 110, examines the data received on the channel to identify which program guides are available by looking firstly for a PSIP type of guide and then an MPEG PSI type of guide. If the received broadcast channel is analog (e.g. NTSC compatible), processor 60, in step 110, parses any data conveyed in the vertical blanking interval (VBI) of the analog signal to identify whether one or more program guides are available. In the event that both a PSIP guide and an MPEG PSI guide are available, processor 60 in step 115, selects a PSIP guide (designated as the highest priority guide) for acquisition and updates an internal database to associate the received broadcast channel with the selected PSIP guide. The PSIP guide is selected as the highest priority guide in accordance with a predetermined guide priority profile. In step 120, processor 60, in conjunction with demultiplexer 22, acquires PSIP data packets and assembles them to form a PSIP guide data structure within the unit 60 internal memory.

In an alternative embodiment, multiple guides (e.g. a PSIP and an MPEG PSI guide) may be acquired and assembled. The multiple guides may be compared and used by processor 60 to identify errors in the guide data or to identify additional broadcast services that are listed in one guide and omitted in another. Thereby, processor 60 may add such additional services to a user's service list by capture of data supporting user access to these services. In step 125, processor 60 parses the captured PSIP guide data to derive information supporting generation of a displayed program guide listing. The displayed program guide shows a user the programs and events and associated scheduled broadcast times available on the received physical transmission channel (PTC). Processor 60 in conjunction with decoder 1000 processes the parsed information and presents the program guide listing display on reproduction device 50. The displayed program guide lists programs for the received transmission channel and the other available channels. In step 130, processor 60 uses the acquired PSIP guide data in directing decoder 1000 in the capture and assembly of packetized data to form a program being broadcast on the user selected broadcast channel. The process of FIG. 2 terminates at step 135.

FIG. 3 shows a flowchart of an initialization method employed by processor 60 and decoder 1000 involving iterative scanning through received terrestrial broadcast channels to associate individual terrestrial broadcast channels with corresponding program guides. Such an initialization method may be performed at power-on, or during low use periods (e.g. during the night) or during a background operation that is invisible to a User, for example. However, this type of scanning operation may not identify guides available for a newly added broadcast channel. Following the start at step 200, processor 60, in step 205, directs system 20 (the FIG. 1 decoder) to tune to receive a next available terrestrial broadcast channel using previously stored physical transmission channel (PTC) tuning information. Further, processor 60, in step 210, directs system 20 to attempt to acquire a digital PSIP guide conveyed on this terrestrial broadcast channel. If processor 60 is successful, it stores the PSIP guide in internal memory and updates an internal database to associate this particular received channel as a PSIP guide type channel (steps 215 and 220 respectively). If acquisition of a PSIP guide was unsuccessful in step 215, processor 60 determines if the received broadcast channel is analog and if so acquires a program guide conveyed in VBI data (if available) in steps 225 and 230 respectively. If the received broadcast channel is not analog (step 225), processor 60 attempts to acquire a digital MPEG PSI guide comprising a program map table and a program association table (PMT and PAT) in step 235. If processor 60 is successful, it stores the MPEG PSI guide in internal memory and updates the internal database to associate this particular received channel as an MPEG PSI guide type channel (steps 240 and 245 respectively). If acquisition of an MPEG PSI guide was unsuccessful in step 240, processor 60 identifies this particular received channel as being without an associated guide in step 250. Following the update of its internal database in steps 220, 230, 245 or 250, processor 60 repeats the channel scanning process by tuning to receive the next terrestrial broadcast channel in step 205. This iterative process is repeated until all the available terrestrial broadcast channels have been scanned and the process is complete at step 207.

FIG. 4 shows a flowchart of an initialization method employed by processor 60 and decoder 1000 involving iterative scanning through received cable broadcast channels to associate individual cable broadcast channels with corresponding program guides. Following the start at step 300, processor 60 in step 305 directs system 20 to tune to receive a next available cable broadcast channel using previously stored physical transmission channel (PTC) tuning information. Further, processor 60, in step 310, directs system 20 to attempt to acquire a digital MPEG PSI guide conveyed on this cable broadcast channel. If processor 60 is successful, it stores the MPEG PSI guide in internal memory and updates an internal database to associate this particular received channel as an MPEG PSI guide type channel (steps 315 and 320 respectively). If acquisition of an MPEG PSI guide was unsuccessful in step 315, processor 60 determines if the received broadcast channel is analog and if so acquires a program guide conveyed in VBI data (if available) in steps 325 and 330 respectively. If the received broadcast channel is not analog (step 325), processor 60 identifies this particular received channel as being without an associated guide in step 335. Following the update of its internal database in steps 320, 330 and 335, processor 60 repeats the channel scanning process by tuning to receive the next cable broadcast channel in step 305. This iterative process is repeated until all the available cable broadcast channels have been scanned and the process is complete at step 307.

FIG. 5 shows a flowchart of a method for determining program guide availability on a broadcast channel in response to User entry of a channel identification number or in response to the addition of a new channel to a decoder channel line-up, for example. Following the start at step 400 and in response to User entry of a channel identification number, processor 60 in step 405 determines from its internal database if the User entered identification number corresponds to a previously scanned channel and is associated with an identified program guide. If a program guide is associated with the selected channel and has been previously acquired, processor 60 in step 430 directs system 20 to tune to receive the selected channel using this previously acquired program guide information. If the selected channel is a channel being received for the first time and has no associated program guide information (e.g. a channel being added to a User's channel line-up), processor 60 initiates a program guide availability scan. Processor 60 in step 410, directs system 20 to tune to receive the selected broadcast channel using previously stored physical transmission channel (PTC) tuning information and attempts to acquire a digital PSIP guide conveyed on the selected broadcast channel. If processor 60 is successful, it stores the PSIP guide in internal memory and updates an internal database to associate the selected channel as a PSIP guide type channel (step 415).

In step 430, processor 60 directs system 20 to tune to receive the selected channel using this previously acquired PSIP guide information. If acquisition of a PSIP guide was unsuccessful in step 410, processor 60 determines if the received broadcast channel is analog and if so acquires a program guide conveyed in VBI data (if available) in steps 420 and 425 respectively. Processor 60 directs system 20 to tune to receive the analog channel using pre-stored PTC tuning information in step 430. If the received broadcast channel is not analog (step 420), processor 60 attempts to acquire a digital MPEG PSI guide comprising a program map table and a program association table (PMT and PAT). If processor 60 is successful, it stores the MPEG PSI guide in internal memory, updates the internal database to associate this particular received channel as an MPEG PSI guide type channel and initiates tuning to receive the selected channel (steps 435, 440 and 430 respectively). If the selected channel was digital and neither PSIP nor MPEG PSI guides were acquired, processor 60 in step 445 initiates repetition of the guide acquisition process from step 410. This iterative process is repeated for a limited number of attempts (e.g. four attempts) or for a limited duration. If, following these attempts, a guide was not acquired, the channel is identified to a User as unobtainable via an on screen message. In certain situations such as during a satellite antenna tuning operation, this process may be set to repeat continuously as part of a channel tuning operation.

FIGS. 6–9 show methods employed by processor 60 for channel number mapping and navigation through channel lists for use in acquiring a User selected channel using different types of pre-stored program guide information. Specifically, FIG. 6 shows a flowchart of a method involving channel number mapping for processing program content data and channel identification numbers to provide a composite image for display. In step 505, following the start at step 500, processor 60 searches a previously acquired database of channel information for the available channels. This database information was accumulated during prior channel scanning operations. Processor 60 searches the database to identify a User selected broadcast channel conveying a desired program in response to User entered physical transmission channel (PTC) channel number and either (or both of) a virtual channel major number and a virtual channel minor number. The database associates physical transmission channel (PTC) channel numbers with a virtual channel major number and a virtual channel minor number in a channel map. The channel map advantageously enables identification of a specific broadcast channel conveying a User desired program from entry of a PTC with a minor number or from entry of a major number together with a minor number. In an alternative embodiment, this channel identification number conversion may be performed using a predetermined and stored algorithm or formula. In the event that a User does not enter a minor number a default value of zero is assumed, however, the default minor number is programmable and may be set to another minor channel number. In step 510, processor 60 directs system 20 to tune to receive the User selected broadcast channel identified using its internal database.

In step 515 processor 60 examines its internal database to identify the type of program guide associated with the User selected transmission channel. In the event that more than one guide is available (e.g. both a PSIP and an MPEG PSI guide), processor 60 selects one guide (e.g. a PSIP guide) for use based on a predetermined guide priority. In step 520, processor 60 in conjunction with demultiplexer 22 of decoder 1000, acquires data packets comprising a program conveyed on the User selected broadcast channel. In step 525, processor 60, in conjunction with decoder 1000, assembles the acquired packets and processes them to form program images (representing the program being broadcast on the user selected broadcast channel) for display. The program images are advantageously displayed together with the associated PTC number and major and minor numbers on reproduction device 50. The process of FIG. 6 terminates at step 530.

FIGS. 7 and 8 show examples of channel selection and decoder tuning based on channel mapping for an MPEG PSI program guide and an ATSC PSIP compatible program guide respectively. The examples show selecting a virtual channel (or sub-channel) and corresponding virtual channel numbers for display when multiple guides and multiple virtual channel identification numbers are being broadcast. Specifically, FIG. 7 shows two channel selection examples and uses MPEG PSI guide information conveyed on physical transmission channel 50 with sub-channels 50-1, 50-2, 50-3 and 50-4. In the first example, a User enters the number 50 via remote unit 70 (FIG. 1) to select physical transmission channel 50 (e.g. NBC). Note, the User may alternatively select the number 50 by menu item selection in a graphical user interface or use a different data entry device such as a keyboard or discrete switches, for example. Processor 60 (FIG. 1) recognizes that an MPEG PSI guide is associated with PTC 50 from its internal database. Further, processor 60 employs the previously stored MPEG PSI guide data in directing system 20 to tune to PTC 50 and to capture, process and display the program images of broadcast channel 50-1 (e.g. the NBC-1 sports sub-channel) identified by default minor number 1. These images are displayed together with the broadcast channel number 50-1. In another embodiment, the channel logo and minor number, e.g. NBC-1 is displayed instead of, or in addition to, the number 50-1.

In the next example in FIG. 7, a User enters the numbers 50 and 2 via remote unit 70 (FIG. 1) to select a specific broadcast channel being conveyed on physical transmission channel 50. Processor 60 uses previously acquired MPEG PSI data in directing system 20 to tune to PTC 50 and to capture, process and display program data conveyed on this channel. The processed program data is displayed together with the broadcast channel number 50-2 (e.g. NBC-2 movie channel) identified by the User entered minor number 2. These images are displayed together with the broadcast channel number 50-2.

FIG. 8 shows four channel selection examples employing ATSC PSIP guide information conveyed on physical transmission channel 50 with virtual channels 99-0, 99-1, 99-2 and 99-3. It is to be noted that different received program guides support different channel mapping structures. A PSIP guide contains channel map data associating a physical transmission channel (PTC) with a major channel number that is associated with a specific broadcaster. As such a PSIP channel map may associate channel 99 with PTC 50 and information provider (i.e. broadcaster) NBC, for example. Therefore, a decoder may advantageously use this mapping data to display selected channel identification numbers or all the different channel identification numbers as well as the channel logo and minor number, e.g. NBC-1. In contrast, a conventional MPEG PSI guide does not fully support such a mapping.

In the first example in FIG. 8, a User enters the number 50 via remote unit 70 (FIG. 1) to select physical transmission channel 50 (e.g. NBC). Processor 60 recognizes that an ATSC PSIP guide is associated with PTC 50 from its internal database. Further, processor 60 employs previously acquired PSIP guide data in directing system 20 to tune to PTC 50 and to capture, process and display a program conveyed on PTC 50 equivalent to virtual channel 99-0 identified by default minor number 0. Note, a different default minor number may be used to identify a particular broadcast channel in one guide channel mapping system (e.g. a PSIP guide system) than in a different guide channel mapping system (e.g. an MPEG PSI guide system). The processed program is displayed together with the broadcast channel number 99-0 derived from the PSIP channel map.

The next example of FIG. 8 differs from the first described example in that the User enters minor number 2 as well as PTC number 50. System 20 and processor 60 apply both of these numbers in determining from the previously acquired PSIP channel map that system 20 is to tune to PTC 50 to acquire a program on virtual channel number 99-2 for display together with channel number 99-2.

In the next example of FIG. 8, the User enters broadcast channel number 99. System 20 and processor 60 determines from the previously acquired PSIP channel map that channel 99 maps to PTC 50 and system 20 tunes to PTC 50 to acquire a program on default broadcast channel number 99-0 for display together with the identification number 99-0. Note, default minor number for channel 99 is 0.

The last example of FIG. 8 differs from the previous described example in that the User enters minor number 2 as well as virtual broadcast channel number 99. System 20 and processor 60 apply both of these numbers in determining from the previously acquired PSIP channel map that system 20 is to tune to PTC 50 to acquire a program on broadcast channel number 99-2 for display together with channel number 99-2.

FIG. 9 shows a flowchart of a method for use by processor 60 and system 20 (FIG. 1) in acquiring program content data in response to User channel selection via navigation through hierarchically associated broadcast channel lists. FIG. 10 shows an exemplary program guide display including hierarchically associated channel lists and associated menu navigation controls. In step 805 of FIG. 9, following the start at step 800, processor 60 directs system 20 to navigate through a first list of broadcast channels in response to User activation of a first navigation control in order to select a broadcast channel identified by a virtual channel number. Such a list of channels may take the form of a program guide channel list exemplified by virtual channel numbers 107–111 (A&E, NBC etc.) in the left column of FIG. 10. Further, the first navigation control may be any form of User interface control such as a channel increment or decrement button on remote unit 70 (FIG. 1) or a cursor based control involving activation of icon 957 of FIG. 10, for example, or some other form of control. Upon selection or highlighting of the desired broadcast channel identified by a virtual channel number e.g. NBC channel 108 (item 905 FIG. 10) the corresponding physical transmission channel number is displayed e.g. PTC 50 for channel 108 (item 910 FIG. 10). In addition, the corresponding sub-channels available for channel 108 including channels 108-0, 108-1, and 108-2 in this example, are displayed in a hierarchically arranged sub-menu (menu 930 of FIG. 10).

In step 810 of FIG. 9, processor 60 directs system 20 to navigate through the second list of broadcast sub-channels (menu 930) hierarchically associated with the selected broadcast channel in response to User activation of a second navigation control. This is done in order to select a desired sub-channel, identified by a virtual channel minor number, for viewing or recording, for example. In exemplary FIG. 10, the second list comprises sub-channels 108-0, 108-1, 108-2 (items 915, 920 and 925) hierarchically displayed for selected broadcast channel 108. The second navigation control, like the first navigation control, may be any form of User interface control such as a channel increment or decrement button on remote unit 70 (FIG. 1) or a cursor based control involving activation of icon 940 of FIG. 10, for example, or some other form of control.

In step 815 of FIG. 9, processor 60 directs system 20 to tune to receive the channel conveying data comprising a program on the sub-channel selected in step 810. Processor 60 employs previously acquired program guide information including tuning information associated with the selected sub-channel stored in its internal database in configuring system 20 to tune to receive the selected sub-channel. In step 820, processor 60 directs system 20 in the capture and assembly of packetized data to form the program being broadcast on the user selected sub-channel. The process of FIG. 9 terminates at step 825.

FIG. 10 lists provides additional features for navigating a program guide including navigation arrows 235, for navigating a subgroup of channels, navigation arrows 245, for navigating a program title, and navigation arrows 255, for navigating the program guide itself. Also included is menu button FAV SERVS 962 that allows for a user to call up selected favorite services, as pre-designated by the user.

The architecture of FIG. 1 is not exclusive. Other architectures may be derived in accordance with the principles of the invention to accomplish the same objectives. Further, the functions of the elements of system 20 of FIG. 1 and the process steps of FIGS. 2–9 may be implemented in whole or in part within the programmed instructions of a microprocessor. In addition, the principles of the invention apply to any form of analog or digital program specific (and program guide) information (including non-MPEG compatible program guide information).

What is claimed is:

1. In a video decoder, a system for acquiring program guide information conveyed on one of a plurality of broadcast channels, comprising the steps of:
    selecting a program guide type from a plurality of different types of program guide;
    associating a program guide of said selected program guide type with a broadcast channel by updating a database in said video decoder; and
    acquiring a program guide of said selected program guide type.

2. A system according to claim 1, including the step of capturing packetized program information comprising a program conveyed on said broadcast channel using said acquired program guide.

3. A system according to claim 1, including the step of displaying a list of available programs and broadcast display times using information derived from said acquired program guide.

4. A system according to claim 1, wherein
said different types of program guide comprise at least one of (a) program specific information, and (b) information contained in a vertical blanking interval of an analog type video signal.

5. A system according to claim 4, wherein
said program specific information includes at least one of (i) information in ATSC compatible program specific information protocol (PSIP) format and (ii) information in MPEG compatible program specific information (PSI) format.

6. A system according to claim 4, wherein
said program specific information includes at least one of (a) program map information including data for identifying individual packetized datastreams that constitute a program, (b) program association information for associating a program with data for identifying packets comprising associated program map information, (c) network information for defining network parameters, (d) channel map information associating channel identification numbers with one or more of, a carrier frequency, transport stream identifier, service type and program number and (e) conditional access information for use in accessing programs that are dependent upon user entitlement.

7. A system according to claim 1, wherein
said broadcast channel comprises a physical transmission channel (PTC).

8. A system according to claim 1, wherein said acquired program guide,
links a transmission channel to a broadcast channel identification number associated with an information provider and a group of sub-channels, and
links a sub-channel from among said group of sub-channels with a second identification number.

9. A system according to claim 8, wherein
said associating step associates said selected program guide with a transmission channel;
said acquiring step acquires a program guide for use in capturing a program conveyed on a broadcast sub-channel; and
said capturing step captures packetized program information comprising a program conveyed on said broadcast sub-channel.

10. A system according to claim 1, including the step of automatically scanning through received broadcast channels and identifying and acquiring an available program guide for individual channels.

11. A system according to claim 1, including the step of automatically scanning through received channels and identifying and acquiring a plurality of program guides for an individual channel, wherein data from at least one program guide of said plurality of acquired program guides is used to update said acquired program guide of the selected program guide type.

12. In a video decoder, a system for acquiring program guide information on one of a plurality of broadcast channels, comprising the steps of:
determining from a decoder database if a program guide is associated with an individual broadcast channel, in response to a user channel change command;
examining data received on said individual broadcast channel to determine program guide availability in response to an absence of a program guide being associated with said individual broadcast channel; and
acquiring an available program guide.

13. A system according to claim 12, including the step of capturing packetized program information comprising a program conveyed on said individual broadcast channel using said acquired program guide.

14. A system according to claim 12, including the step of examining data received on said individual broadcast channel to identify program guide type.

15. A system according to claim 12, wherein said step of determining from a decoder database if a program guide is associated with an individual broadcast channel is performed in response to a user request to add a broadcast channel to a set of viewable channels.

* * * * *

UNITED STATES PATENT AND TRADEMARK OFFICE
CERTIFICATE OF CORRECTION

PATENT NO. : 6,978,471 B1  
DATED : December 20, 2005  
INVENTOR(S) : Scott Edward Klopfenstein and Daniel Richard Schneidewend It is certified that error appears in the above-identified patent and that said Letters Patent is hereby corrected as shown below:

Title page  
Item [75], Inventor, add -- Daniel Richard Schneidewend --.

Column 10,  
Lines 50, 60 and 64, delete "system" and insert -- method --.

Column 11,  
Lines 1, 6, 12, 26, 29 and 36, delete "system" and insert -- method --.

Column 12,  
Lines 4, 8, 16, 27, 32 and 35, delete "system" and insert -- method --.

Signed and Sealed this

Twenty-fifth Day of April, 2006

JON W. DUDAS  
*Director of the United States Patent and Trademark Office*